Aug. 15, 1961  S. W. DOTY  2,996,705
INDICATING DEVICE
Filed Sept. 9, 1959
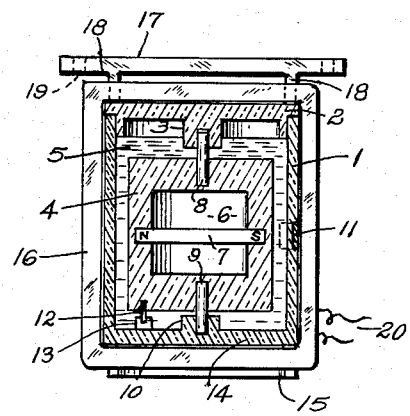
Fig. 1
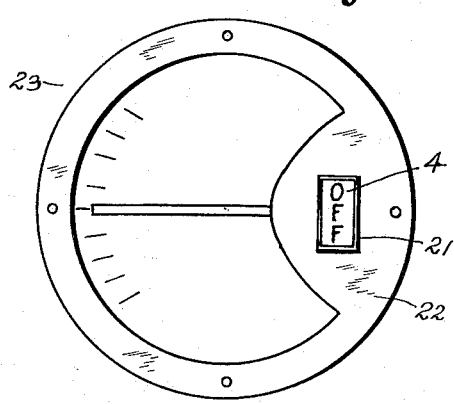
Fig. 2
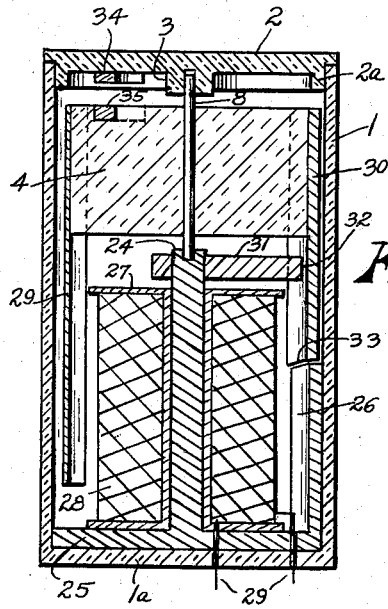
Fig. 3
Fig. 4
INVENTOR.
Spencer W. Doty

United States Patent Office 2,996,705
Patented Aug. 15, 1961

2,996,705
INDICATING DEVICE
Spencer W. Doty, Earlysville, Va., assignor to Specialties, Incorporated, Syosset, N.Y., a corporation of New York
Filed Sept. 9, 1959, Ser. No. 838,929
5 Claims. (Cl. 340—373)

This invention relates to indicating devices and especially to an indicator to show whether an electrical instrument or device is drawing electric current.

In many types of instruments and other electrical devices such as angle of attack indicators and other aircraft instruments it is desirable to be able to tell at a glance whether the instrument is effectively connected in circuit. In the prior art it has been a practice to include a d'Arsonval type movement in the circuit and carrying a flag or other device having the word "OFF" or other indication to show when no current traverses the circuit. This type of movement is expensive and delicate and is easily damaged by shock or rough handling.

It is an object therefore to provide a relatively cheap, easily constructed indicator or "failsafe" for aircraft instruments to show when the instruments are effective or ineffective as a result of drawing current.

Another object is to provide a simple indicator which is both rugged and sensitive and which can be easily fitted into relatively small instruments.

A further object is to provide a current indicator which can be used in conjunction with fuses, electrical applicances such as stoves, irons, refrigerators, heaters; electrical instruments, motors, computers, and in electrical circuits generally.

Other objects will be evident in the following description.

In the drawings:

FIGURE 1 is a part sectional elevation of my electrical circuit indicator.

FIGURE 2 is a face view of an aircraft instrument or other instrument with a circuit indicator of the type shown in FIGURE 1.

FIGURE 3 is a part sectional elevation of a modification of the device of FIGURE 1.

FIGURE 4 is a schematic elevation, in part section, of a simplified modification of the device of FIGURE 1.

In FIGURE 1 casing 1 may be cylindrical and is preferably made of plastic which will stand extremes of high and low temperatures as well as exposure to the sun and weather without crazing or cracking. Within reasonable limits, methyl methacrylate polystyrene, and the like may be used and will provide a desired transparency. Glass may likewise be used.

Flanged cap 2 having central, bored, bearing boss 3 is cemented or otherwise sealed to the upper rim of cylinder 1 after placing rotor 4 and fluid 5 in the cylinder. This fluid serves as a damping medium and also provides buoyancy for rotor 4 which may be made of a light weight plastic or other material and which may have inner chamber 6 to reduce weight. The rotor 4 may be cast or molded in two pieces and then cemented, bonded, or fastened together with screws, in leak proof manner. Permanent bar magnet 7 is molded into the rotor and is aligned substantially at right angles to the axis of stub shafts 8 and 9 which are axially aligned with respect to the axis of rotor 4, being molded into the rotor structure as indicated. These shafts may be made of stainless steel or any suitable material.

Shaft 9 is rotatable in bearing boss 10 and shaft 8 is rotatable in bearing boss 3. The buoyancy of the rotor may be designed to remove, in effect, all or nearly all of the downward weight of the rotor, so that shaft 9 exerts very little downward thrust against bearing 10.

It is obvious that jewel type bearings can be used if desired. Arcuately shaped permanent magnet strip 11 is imbedded in an arcuate slot around a portion of the outer area of cylinder 1 and may be cemented in place. This magnet serves to return magnet 7 and rotor 4 to zero or starting position which can be determined by stop pin 12 in rotor 4 striking stop 13 molded into the bottom of casing 1. A similar stop projecting from the base 14 will limit rotation of the rotor in opposite direction. Pin 12 is molded or pressed into the rotor. These stops are not essential however.

Integrally molded with base 14 is projecting cylindrical ring 15 having two opposed slots in which rectangular winding 16 is placed. This winding surrounds the casing 1, cap 2, and bottom piece 14. The winding passes between bar or rail 17 and a similar spaced bar parallel therewith. Bar 17 is integral with legs 18 molded integrally with cap 2, and the other bar, not shown, is similarly supported. These bars have holes 19 for receiving mounting screws. Various other suitable constructions may be used however. Cap 2 may be thick and a simple slot in the cap can hold the upper leg of the winding.

If the device is used in an aircraft instrument such as an angle of attack indicator or other electrical type aircraft instrument, the liquid 5 should remain in liquid form over a wide range of temperatures, say, from —60 degrees F. to +200 degrees F. Some of the less viscous silicone liquids are suitable for this purpose. The liquid should also not have any deleterious effect upon the plastic or other material of the casing and contained rotor.

In operation, the combined weight of magnet 7 and cylinder 4 preferably is just about equal to the buoyancy due to the liquid so that there is very little if any downward pressure of shaft 9 against bearing 10. The pin 12 is normally held against stop 13 by the attraction of magnet 11 for a pole of magnet 7 although element 11 could be of soft iron and the force tending to return magnet 7 and cylinder 4 to zero position would be due to induced magnetism in element 11. In this case the element 11 would be arranged so that it would be progressively closer to the adjacent pole of magnet 7 as the zero point is approached. This can be done by placing element 11 in a variable depth slot in casing 1 or the strip 11 may be placed inside the casing.

The initial or zero position of magnet 7 is such that the axis of this magnet lies at an angle to the plane of winding 16 and when this winding is energized with current supplied through winding terminals 20 the magnet 7 and rotor 4 are rotated until magnet 7 is substantially aligned with the magnetic flux of winding 16 if free to turn. Another suitable stop similar to stop 13 is preferably arranged to limit the rotation of the rotor. For practical purposes an angle of rotation of element 4 ranging from 35 degrees to 60 degrees will usually be sufficient for most purposes. When winding 16 is de-energized the magnetic interaction of magnet 7 with element 11 causes the rotor 4 to be returned to zero or starting position, pin 12 being urged against stop element 13. This magnetic return system is superior to a spring in that it is easier to calibrate; there is less danger of entanglements, and temperature extremes may be of less effect.

As shown in FIGURE 2, the cylinder or rotor 4 is arranged in register with window 21 in front portion 22 of the casing of instrument 23 which may be an angle of attack indicator for aircraft or an instrument or device of any kind using electric current. The terminals 20 of winding 16 are connected in circuit with a winding or electrical component of instrument 23 and rotor 4 is therefore rotated through an angle to show a blank surface through window 21, or the word "ON" can be imprinted, embossed, or otherwise made to appear on the rotor surface. This indicates that the current is "ON." If now the current suppled to instrument 23 is interrupted, the rotor 4 will be magnetically returned to zero or starting position, as described, and the word "OFF" will appear in window 21, indicating that the device 23 is not being supplied with current. The word "OFF" is printed or otherwise fashioned on the rotor and is arranged to appear in the window when stop pin 12 is resting against stop element 13. The signal "OFF" may be in red color if desired. This indicator therefore graphically shows when an associated instrument or device is not functioning properly or is not being supplied with current. Of course, various words or indicia may be used with the rotor to show "OFF" or "ON" conditions.

In FIGURE 3 like numbers will be used for equivalent parts as shown in FIGURE 1. Casing 1 in this modification is likewise made of clear plastic or glass and cap 2 is fitted by means of flange 2a and may be cemented. Bearing 3 guides the upper end of shaft 8, the lower end of which is rotatable in a bearing in the upper end of central core member 24 which is integral with iron or steel disc 25 from which integral pole 26 rises. Member 26 is curved to fit the inner surface of casing 1 and is coaxial with cylindrical member 24. Members 24, 25, and 26 are of iron or steel of good magnetic permeability such as silicon steel, but some of the nickel high permeability alloys may be used.

Spool 27 preferably of brass, plastic, or other non-magnetic material has winding 28 which may be energized through leads 29 to provide magnetic flux. Leads 29 are brought out through suitable holes in base 1a, member 25, and the bottom flange of the spool. Rotor 4 is fastened coaxially to non-magnetic shaft 8, by friction or otherwise, and carries thin, preferably non-magnetic flag or indicating element 29 which is curved coaxially with shaft 8. This element is rotatable about the axis through a predetermined angle which, in practice, may be from 35 to 60 degrees. The element is movable in the space between spool 27 and casing 1. This element may carry the word "OFF" or any other desired designation.

Iron, steel or other magnetizable member 30 is attached to rotor or cylinder 4 which is preferably made of plastic and which may be solid or hollow. Attachment of elements 29 and 30 may be by means of cement or screws and these elements are, preferably, set in slots or recesses in element 4. The inner and outer surfaces of element 30 are curved coaxially with shaft 8 and element 24. Iron or steel bar 31 is bored to be fitted tightly over the upper end of member 24, and its outer end 32 is curved to conform to the curvature of element 30. The fixed end 32 is spaced from member 30 by about 5 thousandths of an inch or less. The upper end of member 26 is slanted or inclined as shown, and the lower end 33 of member 30 is similarly inclined. The end surfaces of these members may be plated or coated with copper or other non-magnetic material to prevent sticking, in case they are allowed to touch. Suitable stops may be used to limit angular movement of the rotatable elements.

Permanent magnet 34 is curved coaxially with shaft 8 and is cemented or otherwise attached to cap 2. Similarly shaped iron or steel element 35 is imbedded in rotor 4 and may be a permanent magnet or of soft iron. If the latter construction is used, it is desirable to have the iron of tapered thickness so that it will tend to move toward the position of minimum separation from magnet 34 and so will return rotor 4 to initial or zero position. As before, the casing may be filled with a silicone fluid, glycerine, or other suitable liquid which will help to float the rotor and which will be a liquid under extremes of temperature. It is desirable to design the rotor assembly so that it will be balanced. Weights may be added for this purpose. Elements 24, 25, 26, 30 and 31 should be of magnetizable metal such as silicon steel or the equivalent, which can be magnetized and de-magnetized readily.

In operation, leads 29 are connected in an instrument circuit, or in any circuit which it is desired to monitor. The initial position of element 30 is such that the leading edge of bottom edge 33 just slightly overlaps the trailing edge of element 26. Then the energization of winding 28 will cause magnetic flux to traverse the magnetizable elements and the two air gaps between elements 31—30 and 30—26. Since the edges of the latter elements are inclined the rotor will rotate in clockwise direction as seen from above and the edge 33 will finally strike element 26 if a stop does not prevent. Since the air gap between edge 33 and element 26 becomes progressively narrower the magnetic pull tends to become increasingly stronger with clockwise rotation of the assembly, partially off-setting the normal reduction of torque as a rotor tooth comes into alignment with a stator tooth or pole. Upon deenergization of the winding, the field from magnet 34 acts upon element 35 to return the rotor assembly to starting position, indicating that no current is passing through the winding.

FIGURE 4 shows a diagrammatic representation of a modification of the device of FIGURE 1, but looking along the plane of the winding which is shown in cross section. The casing 1 in this case is sealed by cap 2 which is slotted to receive winding 16 which also enters a slot in the lower portion 1b of the casing. Elements 8a and 8b integral with plastic rotor 4 and projecting axially therefrom serve as supporting shafts. These elements are rotatable in suitable depressions in cap 2 and casing portion 1b. Plate or bar 17 may be screwed or otherwise attached to cap 2 and may have holes to receive screws for attaching the indicator to an instrument or other device. This provides a very simple construction.

This indicator or fail-safe is useful in connection with many instruments and devices, in addition to aircraft instruments. For instance, it may be connected in circuit with or used in conjunction with circuit breakers, fuses and fuse blocks, electromagnets, solenoids, motors, servo-mechanisms, control circuits, soldering irons, stoves and other electrical appliances, refrigerators, automobile generators and the like, and for many other purposes.

It is obvious that numerous changes of detail may be made without departing from principles which I have disclosed.

What I claim is:

1. In an indicating device, a cylindrical casing member, a cap for said casing member, a hollow cylindrical element mounted in said cap and casing member for rotation through an angle, the axis of said hollow element being substantially coincident with the axis of said cylindrical casing member, an elongated permanent magnet carried by said hollow element and aligned substantially at right angles to the axis thereof, liquid in said casing providing buoyancy for said hollow element, a magnetizing winding placed around said cap and casing member, magnetic flux developed by said winding being directed generally at right angles to the axis of said cylindrical casing member, and means biasing said permanent magnet to rotate said hollow member to predetermined position.

2. The device as described in claim 1, and including a pair of spaced bars attached to said cap.

3. The device as described in claim 1, portions of said winding being placed in a slot in said cap and in a parallel slot in the base of said cylindrical casing member.

4. In an indicating device, a transparent cylindrical casing member, a sealing cap for said casing member, said cap having a coaxial recess therein to serve as a bearing and having a slot across the outer face thereof, a cylindrical hollow element within said casing member coaxial therewith and spaced therefrom, the base of said cylindrical casing member having a coaxial recess therein to serve as a bearing, shaft means projecting from opposite faces of said hollow cylindrical element and coaxial therewith, said shaft means having bearing in said recesses, the base of said cylindrical casing member having an outer slot therein substantially parallel with the first named slot, and an electrical winding around said casing member and cap and placed in said slots, a magnetizable element carried by said hollow element, and liquid within said casing providing buoyancy for said hollow element.

5. The device as described in claim 4, and including an elongated permanent magnet carried by said hollow element and aligned substantially at right angles to the axis thereof, and magnetizable means attached to said device for influencing said magnet to return said hollow element to predetermined position relative to said casing member.

References Cited in the file of this patent

UNITED STATES PATENTS

| | | |
|---|---|---|
| 2,229,774 | Schulze-Herringen | Jan. 28, 1941 |
| 2,367,299 | McLorn et al. | Jan. 16, 1945 |
| 2,671,208 | Lamb | Mar. 2, 1954 |
| 2,772,408 | Davis et al. | Nov. 27, 1956 |

FOREIGN PATENTS

| | | |
|---|---|---|
| 931,564 | Germany | Aug. 11, 1955 |